United States Patent
Keller

(10) Patent No.: US 11,407,154 B2
(45) Date of Patent: Aug. 9, 2022

(54) METHOD FOR PRODUCING A VEHICLE TRIM PART

(71) Applicant: HIB Trim Part Solutions GmbH, Bruchsal (DE)

(72) Inventor: Bernd Keller, Karlsruhe (DE)

(73) Assignee: HIB Trim Part Solutions GmbH, Bruchsal (DE)

( * ) Notice: Subject to any disclaimer, the term of this patent is extended or adjusted under 35 U.S.C. 154(b) by 0 days.

(21) Appl. No.: 17/072,423

(22) Filed: Oct. 16, 2020

(65) Prior Publication Data

US 2021/0031416 A1    Feb. 4, 2021

Related U.S. Application Data

(63) Continuation of application No. PCT/EP2019/052879, filed on Feb. 6, 2019.

(30) Foreign Application Priority Data

Apr. 25, 2018    (DE) ..................... 10 2018 109 999.1

(51) Int. Cl.
    *B29C 45/14*    (2006.01)
    *B29C 45/16*    (2006.01)
    *B29C 45/00*    (2006.01)
    *B29K 101/12*   (2006.01)
    *B29K 309/08*   (2006.01)
    *B29L 31/30*    (2006.01)

(52) U.S. Cl.
    CPC ...... *B29C 45/1679* (2013.01); *B29C 45/0005* (2013.01); *B29C 45/0053* (2013.01); *B29C 45/14786* (2013.01); *B29C 2045/0079* (2013.01); *B29K 2101/12* (2013.01); *B29K 2309/08* (2013.01); *B29L 2031/3005* (2013.01)

(58) Field of Classification Search
    CPC ............ B29C 45/1679; B29C 45/0005; B29C 2045/0012; B29C 45/14786
    See application file for complete search history.

(56) References Cited

U.S. PATENT DOCUMENTS

| 2005/0153120 | A1* | 7/2005 | Birrell | .................. B29C 70/081 |
| | | | | 428/298.1 |
| 2014/0309341 | A1* | 10/2014 | Ribaric | ..................... C08L 1/02 |
| | | | | 524/35 |

FOREIGN PATENT DOCUMENTS

| CN | 103260843 A | 8/2013 |
| DE | 102004062510 A1 | 7/2006 |

(Continued)

OTHER PUBLICATIONS

German Search Report dated Apr. 10, 2019 in corresponding German Application No. 10 218 109 999.1 (5 pages).

(Continued)

*Primary Examiner* — Edmund H Lee
(74) *Attorney, Agent, or Firm* — Harness, Dickey & Pierce, P.L.C.

(57) ABSTRACT

A method for producing a trim part (1) with a visible side (S) for use in vehicles has steps of producing a support substrate (2) from a fiber composite material. The fiber composite material is injected into a mold cavity of an injection mold. A surface is formed on a first side of the support substrate (2) that faces the visible side (S) of the trim part (1). A lacquer layer (3) is formed by directly coating the surface of the support substrate (2). The lacquer layer (3) is coated with a protective layer (4).

11 Claims, 1 Drawing Sheet

(56) References Cited

FOREIGN PATENT DOCUMENTS

| | | |
|---|---|---|
| DE | 202007007498 U1 | 7/2008 |
| DE | 102010005700 A1 | 9/2011 |
| DE | 202014101678 U1 | 4/2015 |
| DE | 102014210034 A1 | 11/2015 |
| DE | 102016206517 A1 | 10/2017 |

OTHER PUBLICATIONS

International Search Report and Written Opinion dated Apr. 23, 2019 in corresponding PCT Application No. PCT/EP2019/052879 (8 pages).
Chinese Office Action dated Sep. 2, 2021 in corresponding Chinese Application No. 201980004375.6.

* cited by examiner

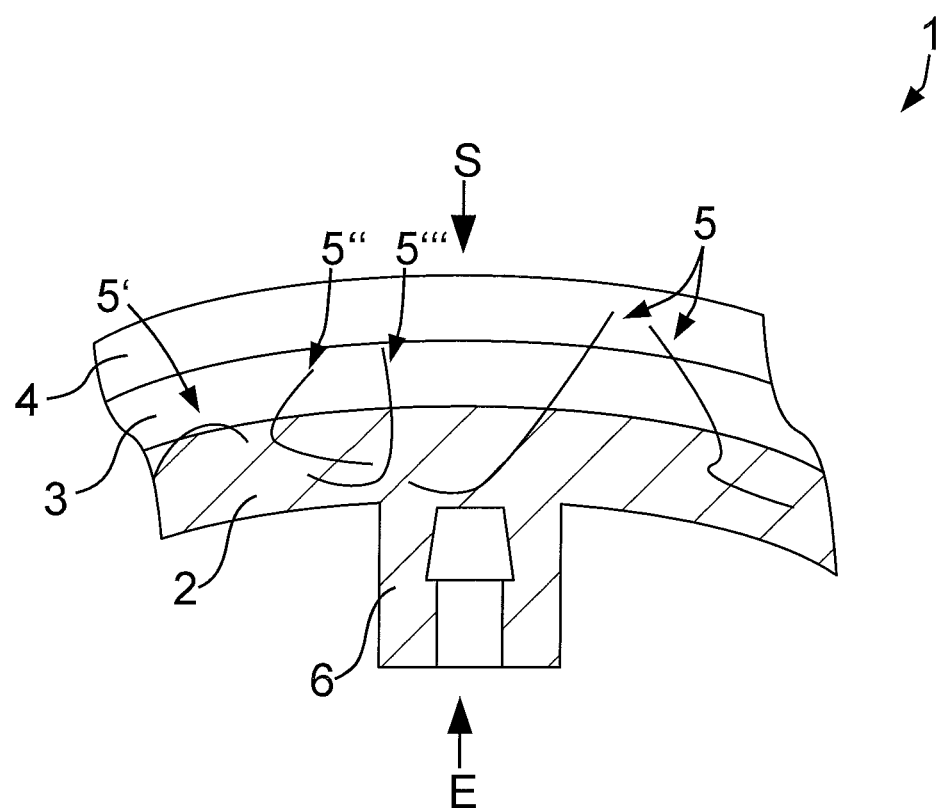

METHOD FOR PRODUCING A VEHICLE TRIM PART

CROSS-REFERENCE TO RELATED APPLICATIONS

This application is a continuation of International Application No. PCT/EP2019/052879, filed Feb. 6, 2019, which claims priority to German Application No. 10 2018 109 999.1, filed Apr. 25, 2018. The disclosures of the above applications are incorporating herein by reference.

FIELD

The disclosure relates to a vehicle trim part and to an associated production method for producing a vehicle trim part.

BACKGROUND

Various vehicle trim parts and associated methods for producing the same are known in the prior art. Some of the vehicle trim parts disclosed in the prior art are composed of a support and an intermediate layer coated with a layer of lacquer. For reasons of cost efficiency and stability, these supports are typically injection molded from a fiber-reinforced plastic. Until now, the supports have then been coated with the intermediate layer, which will be lacquered in a later process step. In most cases, the intermediate layer is a wood veneer or veneer. The immediate layer must be prepared for the lacquer application by multiple mechanical and chemical processing stages. The processing steps used in processing the veneer may include cutting, sanding, and staining. Thus, this substantially removes the surface structure of the same. Thus, this structure is not visible in the layer of lacquer formed with the lacquer application.

However, producing a trim part for a vehicle that has such an intermediate layer is time-consuming and costly. This is due to the fact that additional material is required that must be machined and joined to the support.

If the lacquer layer is formed directly on the support without the intermediate layer, fibers of the fiber composite material will penetrate the lacquer layer. This creates visual defects in the lacquer layer and the trim part. The trim part must provide a "Class A" surface. Thus, surface is visible on the exterior or in the interior of the vehicle. Accordingly, visual defects are not acceptable.

SUMMARY

It is an object of the disclosure to overcome the aforementioned disadvantages. It is an object to provide a trim part and an associated method for producing a trim part that is inexpensive and quick to produce and has a visually flawless visible side.

This object is attained by a method for producing a trim part with a visible side for use in vehicles comprising the steps of producing a support substrate from a fiber composite material. The fiber composite material is injected into a mold cavity of an injection mold. A surface is formed on a first side of the support substrate that faces the visible side of the trim part. A lacquer layer is formed by directly coating the surface of the support substrate that is formed when the support substrate is produced with a lacquer. When the lacquer layer is formed, a lacquer surface facing the visible side is formed. Inhomogeneities are formed as a result of the process by fibers of the fiber composite material protruding from the support substrate and penetrating the lacquer surface. The lacquer layer is coated with the protective layer. The protective layer forms a homogeneous protective layer surface that defines the visible side. The inhomogeneities are covered so that the inhomogeneities on the visible side are not visible.

According to the disclosure, a method for producing a trim part for vehicles is proposed. The trim part has a visible side, that is defined by when the trim part is installed, the visible side faces an observer. When the trim part is mounted in or on a vehicle, the visible side is visible to an observer of the trim part. The method for producing the trim part comprises a support substrate produces from a fiber composite material comprising fibers by injecting the fiber composite material into a mold cavity of an injection mold. A surface is formed on a first side of the support substrate that faces the visible side of the trim part. A lacquer layer is formed by directly coating the surface of the support substrate with a lacquer. The lacquer layer is coated with a protective layer.

The fiber composite material includes a plastic material and a multiplicity of fibers. The plastic material is preferably a thermoplastic. The fibers are preferably glass fibers. The lacquer used to produce the lacquer layer may be a monochromatic lacquer, a metallic lacquer, a piano lacquer, or some other special-effect lacquer. The lacquer is preferably a polyurethane lacquer. The lacquer may also contain pigments or other additives. The protective layer is preferably translucent. More preferably, the protective layer is transparent with a transmission factor of preferably up to 90%. After coating, the protective layer may also be actively cured. The described process corresponds to a two-stage lacquering process coating the trim part composed of forming a lacquer layer and coating the lacquer layer with a protective layer.

The disclosure provides that, during coating of the surface of the support substrate, the lacquer layer is applied directly to the surface that is formed when the support substrate is produced. No intermediate layer is arranged between the surface of the support substrate and the lacquer layer. The surface of the support substrate that is formed when the support substrate is produced is not mechanically modified prior to coating. Since no modification of the surface is necessary, processing steps in producing the trim part can be omitted. This makes production of the trim part significantly more advantageous. Despite the omission of these processing steps and the application of lacquer directly onto the fiber composite material, the trim part produced by the method according to the disclosure has a visually flawless surface on the visible side.

In the method for producing a trim part, a lacquer surface facing the visible side is formed when the lacquer layer is formed. Due to the support substrate formed from the fiber composite material, the lacquer surface has inhomogeneities that are formed from the fibers of the fiber composite material as a result of the process or due to the fiber composite material. The fibers protrude from the support substrate or from a surface of the support substrate. The fibers penetrate the lacquer surface or are partially enclosed by it. During coating of the lacquer layer with the protective layer, the protective layer forms a homogeneous protective layer surface that defines the visible side. The inhomogeneities are thereby covered or enclosed by the protective layer. Thus, the fibers form a visual unit with the protective layer and are not visible to an observer on the visible side. The fibers can extend into the protective layer and are enclosed by it. The fibers in the protective layer are not discernible to an observer. Thus, the lacquer surface is apparently homogeneous and without inhomogeneities or imperfections.

Without the protective layer, an observer can discern the inhomogeneities with the naked eye from a distance of approx. 30 cm from the lacquer surface. After the lacquer layer has been coated with the protective layer, the inhomogeneities can no longer be discerned by an observer with the naked eye from the aforementioned distance. Therefore, the inhomogeneities under and/or in the protective layer are not visible to him.

An advantageous refinement of the method provides that the lacquer layer is cured before being coated with the protective layer. In the refinement, the lacquer layer is cured at least enough to prevent it from mixing with the protective layer when it is coated with the protective layer.

In an advantageous refinement, the fiber composite material is a fiber-reinforced plastic having a fiber volume of up to 40%, preferably between 10% and 30%.

An advantageous method variant provides that the fiber composite material is a thermoplastic reinforced with glass fibers.

In one embodiment variant of the method, the coating of the support substrate with the lacquer is repeated multiple times. Thus, the lacquer layer is multilayered.

In an advantageous refinement alternative, the protective layer is a clear lacquer. Further, the protective layer is up to 2.0 mm thick (lacquer layer thickness). In addition, in a further advantageous embodiment of the method the clear lacquer and/or the lacquer is a polyurethane lacquer or at least has a polyurethane base.

Furthermore, in the method the protective layer is preferably between 0.3 and 2 mm thick, preferably between 0.3 and 1.0 mm thick (protective layer thickness).

In an advantageous refinement of the method, during production of the support substrate, a fastening element for fastening the trim part is formed on a second side of the support substrate. This forms an installation side of the trim part opposite the visible side. The fastening element is preferably an integral part of the support substrate.

Also proposed according to the disclosure is a trim part for a vehicle, produced by the method according to the disclosure.

The trim part is therefore formed from a support substrate made of a fiber composite material. The part comprises, directly on its visible side, a lacquer layer that is coated with a protective layer.

The features disclosed above can be combined in any way as long as such combination is technically feasible and the features do not contradict one another.

Other advantageous refinements of the disclosure are characterized in the dependent claim, They will be described in greater detail in the following, in conjunction with the description of the preferred embodiment of the disclosure, with reference to the FIGURE. In the drawing:

DRAWINGS

FIG. 1 is a cross sectional view of a trim part according to the disclosure.

DETAILED DESCRIPTION

The FIGURE shows a schematic example. The same reference symbols in the FIGURE denote the same functional and/or structural features.

The trim part 1 shown in FIG. 1 has a support substrate 2, lacquer layer 3 and protective layer 4, On the installation side E of the trim part, a fastening element 6 is integrally formed by the support substrate 2. The fastening element 6 of the trim part 1 can be fastened onto the vehicle. The support substrate 2 is made of a glass fiber reinforced plastic 5',5",5'", Some of the support substrate 2 extend out of the surface of the support substrate 2 in a direction toward the visible side S of the trim part 1. The lacquer layer 3 is formed by coating the surface with a black, substantially opaque lacquer. The protruding fibers 5',5" are partially covered by the lacquer layer 3. Another portion of the fibers 5, 5'" extends through the lacquer layer 3, However, this forms inhomogeneities on the lacquer surface toward the visible side S. The protective layer 4 is formed from a clear lacquer. This defines the visible side S of the trim part. The protective layer 4 covers or encloses the fibers 5, 5'". The protective layer 4 visually conceals the fibers 5, 5'" that extend through the lacquer layer 3. Thus, the fibers 5, 5'", in the protective layer 4 and in front of the lacquer layer 3 cannot be discerned by an observer. This makes the visible side S of the trim part 1 appear visually homogeneous.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for producing a trim part with a visible side for use in vehicles, comprising the steps of:
    injecting a fiber composite material into a mold cavity of an injection mold to form a support substrate having a surface formed on a first side of the support substrate that faces the visible side of the trim part;
    forming a lacquer layer by directly coating the surface of the support substrate, with a lacquer, and when the lacquer layer is formed, a lacquer surface, facing the visible side, is formed, and the lacquer layer has inhomogeneities formed from fibers of the fiber composite material that protrude from the support substrate and penetrate the lacquer surface;
    coating the lacquer layer with a protective layer, and when the lacquer layer is coated with the protective layer, the protective layer forms a homogeneous protective layer surface that defines the visible side, and the inhomogeneities are covered so that the inhomogeneities on the visible side are not visible.

2. The method for producing a trim part according to claim 1, wherein the lacquer layer is cured before being coated with the protective layer.

3. The method for producing a trim part according to claim 1, wherein the fiber composite material is a fiber-reinforced plastic having a fiber volume of up to 40%.

4. The method for producing a trim part according to claim 3, wherein the fiber composite material is a thermoplastic reinforced with glass fibers.

5. The method for producing a trim part according to claim 1, wherein the coating of the support substrate with the lacquer is repeated multiple times, and therefore, the lacquer layer is multilayered.

6. The method for producing a trim part according to claim 1, wherein the protective layer is up to 2.0 mm thick.

7. The method for producing a trim part according to claim 6, wherein the protective layer is between 0.3 and 1.0 mm thick.

8. The method for producing a trim part according to claim 1, wherein the protective layer is a clear lacquer.

9. The method for producing a trim part according to claim 1, wherein the protective layer is formed from polyurethane lacquer.

10. The method for producing a trim part according to claim 1, wherein the lacquer used to form the lacquer layer on the surface of the fiber composite material is a polyurethane lacquer.

11. The method for producing a trim part according to claim 1, wherein on a second side of the support substrate, which forms an installation side of the trim part opposite the visible side forming, a fastening element is included for fastening the trim part during production of the support substrate.

\* \* \* \* \*